United States Patent [19]
Dunand

[11] Patent Number: 5,847,720
[45] Date of Patent: Dec. 8, 1998

[54] APPARATUSES AND PROCESSES FOR THE PRODUCTION AND REPAIR OF COLOR FILTERS

[75] Inventor: Alain Dunand, Valence, France

[73] Assignee: TOXOT Science & Applications, Bourque-Les-Valence-Cedex, France

[21] Appl. No.: 375,293

[22] Filed: Jan. 20, 1995

[30] Foreign Application Priority Data

Feb. 4, 1994 [FR] France .................................. 94 01283

[51] Int. Cl.⁶ ........................................................ B41J 2/01
[52] U.S. Cl. ................................................................ 347/1
[58] Field of Search ................................... 347/1, 37, 43, 347/73, 106; 346/29; 359/891; 101/170, 151, 211, 34, 35, 424.1; 358/331

[56] References Cited

U.S. PATENT DOCUMENTS

| | | | |
|---|---|---|---|
| 4,620,196 | 10/1986 | Hertz et al. | 347/15 |
| 4,901,088 | 2/1990 | Hertz et al. | 347/9 |

FOREIGN PATENT DOCUMENTS

| | | |
|---|---|---|
| 2 637 844 | 4/1990 | France . |
| 2 678 549 | 1/1993 | France . |
| 2 689 813 | 10/1993 | France . |
| 63-235901 | 9/1988 | Japan . |
| 63-294503 | 12/1988 | Japan . |
| 5-142413 | 6/1993 | Japan . |
| 5-224007 | 9/1993 | Japan . |
| 5-241012 | 9/1993 | Japan . |

*Primary Examiner*—Benjamin R. Fuller
*Assistant Examiner*—L. Anderson
*Attorney, Agent, or Firm*—Oblon, Spivak, McClelland, Maier & Neustadt, P.C.

[57] ABSTRACT

An apparatus for the production and repair of color filters from a substrate on which is deposited a regular network of color blocks. The apparatus includes a very stable Table 23 supporting the substrate and a printing head 25 using a high resolution, continuous ink jet with one or more nozzles supplied by an ink circuit. A mechanical motor driven device 28 provides for the relative displacement of the substrate 24 with respect to the printing head 25 and a measuring device 300 measures the position of the Table 23 by laser interferometry or by optical encoding. Ink positioning system 34 positions ink droplets using microscopic optics and a system inspects and controls the complete apparatus.

21 Claims, 4 Drawing Sheets

APPARATUSES AND PROCESSES FOR THE PRODUCTION AND REPAIR OF COLOR FILTERS

BACKGROUND OF THE INVENTION

1. Field of the Invention

The present invention relates to an apparatus, a production process and a repair process for color filters used in electronic, color image acquisition devices, such as electronic cameras, or in devices for direct display on a screen. A color filter is a characteristic component of a color screen or display. It is the transparent panel produced from a glass substrate, which constitutes the front face of the screen and on which is arranged a regular network or system of colored blocks contributing to the creation of the color by the optical filter effect.

2. Discussion of Background

Electronic devices for the manipulation of color pictures are at present undergoing a significant development, more particularly due to the rapid evolution of display technologies. Thus, the technology of the cathode ray tube, based on a light emission process for which the restoration of the pictures takes place by means of an appropriate scan of the screen by an electron beam, deflected at high speed in such a way that the selectively excited pixels faithfully reproduce the pictures to be transmitted, remains very widely used in television receivers and office computer screens, but is relatively inappropriate for portable or small devices. Thus, when a single electron beam is deflected over large amplitudes the diagonal of the screen imposes overall dimensions of the cathode ray tube incompatible with portable computers, with large format television receivers, with instrumentation or car instrument panels.

To solve this problem, the technology of liquid crystal display (LCD) panels makes it possible to obtain much more compact color screens. FIG. 1 is an exploded view and FIG. 2 a cross-sectional view of an embodiment of an active matrix color screen 1 based on liquid crystal technology. This screen 1 results from the assembly of the front panel $P_1$ and rear panel $P_2$, separated by a few fractions of a micron to a few microns (0.6 to 10 $\mu$m) according to liquid crystal technology and sealed at high temperature. The front panel $P_1$ is produced from a generally glass plate or substrate 2, whereof a first face 7, corresponding to the front face of the screen facing the observer, is covered with an optical polarization layer 6 constituted by a material having anisotropic characteristics. On the second face 8 of the substrate 2, opposite to the first face 7, is deposited A fine layer of transparent, colored materials constituting the blocks 9 or subpixels of e.g. three colors, which can e.g. be red, green and blue and which together form a color filter. These blocks are organized in accordance with particular geometries in order to obtain color filters, in mosaic for television applications or in linear form for office computers and whose transmission spectrum corresponds to precise characteristics. In image display systems, the blocks are generally separated by a black matrix 10, which is generally obtained by the deposition of metal oxides and which is intended both to increase the contrast of the screen and mask the non-transparent, functional elements of the screen, such as control transistors, or color interferences between the blocks.

The space between the front panel $P_1$ and rear panel $P_2$ is filled by liquid crystal. In order to ensure a constant thickness of the thus formed liquid crystal layer 4, the colored blocks 9 are covered with a transparent planarization layer 11, which also serves as a barrier and for passivation with respect to the liquid crystal. The display of each block is obtained by an electric field, which aligns the crystals in accordance with its direction and which is created by applying a voltage between a transparent control electrode 12 of the block located on the face 13 of the glass plate 3 of the rear panel $P_2$ of the screen, facing the liquid crystal layer 4, and a perfectly transparent counterelectrode 14 facing said liquid crystal layer 4 on the planarization layer 11. This is why the latter must be perfectly planar and must also have appropriate dielectric properties.

The liquid crystal layer 4 is in contact on each of its two faces with a previously treated, very thin, alignment layer 15 for orienting the liquid crystal molecules directly in contact therewith. Between the alignment layer 15 and the glass plate 3 for producing the rear screen panel are positioned transparent control electrodes 12 for the display of the blocks, non-transparent TFT control transistors 16, as well as non-transparent, row and column electrodes 17. The transistors and the row electrodes are placed behind the black matrix 10, which hides them because they are not transparent.

In the same way as the face 7 of the panel $P_1$ corresponding to the front of the screen is covered with a polarization layer 6, the face 19 of the rear panel $P_2$ corresponding to the rear face of the screen is covered with a polarizer or polarization layer 18. Thus, a uniform, time-constant light or lighting 20 placed on the rear surface of the screen and having a white color emits towards the liquid crystal 4 a polarized light as a result of the polarizer filter 18 placed on the outer face 19 of the rear panel $P_2$. In accordance with the control states of an array of transistors 16 serving as voltage switches for the electrodes 12 positioned level with each colored block of the screen and whereof the operation exploits the birefringent optical properties of the liquid crystals, the light does or does not reach the eye of the observer. Thus, the observer sees a red light 21 on the front, outer face 5 of the screen at the location of a red colored block 22, when the control transistor 16 has acted on the transmission of the thickness of the liquid crystal facing the control electrode 12. Such a liquid crystal screen functions in optical transmission of the light with the red, green or blue color level with the block in accordance with the color of the filter deposited at this location.

Among the existing procedures for the production of color filters, there exists photolithography involving the production of optical masks, the deposition of resin layers, the exposure of photosensitive resins, chemical etching operations and successive cleaning operations and sometimes resin crosslinked phases by photochemical or thermal action.

For the actual color filters, it is possible to use gelatin uniformly deposited on the glass and covered with photosensitive resin, which is then impressed and then chemically dissolved so as to only leave the blocks of the same color, into which is then diffused and then fixed a colorant, prior to the removal of the photosensitive resin mask.

This operation is repeated for each color. The disadvantages of this procedure are the large number of stages, the traces left behind on the surface of the color filter and the fluctuations in the diffusion of the colorants.

It is also possible to use previously colored resins such as polyimides or benzocyclobutene (BCB), or photoimageable colored resins, but in all cases the performance of the different stages remains very difficult.

Electrodeposition is another method utilizing an organization of the electrodes and color filters of the screen in linear manner making it possible to polarize the electrodes facing each of the colored in independent form. In order to deposit each of the colored, the substrate, carrying the electrodes organized in linear manner, is immersed in an electrolytic bath containing mixture of polymer and colorant and the energizing of the electrodes facing the color of the bath creates, by decreasing the pH at the electrodes, a local precipitation of the polymer, which simultaneously fixes the colorant on the electrode. A supplementary baking definitively fixes the color filter.

Although this method makes it possible to produce large filters, it takes a long time, namely about twenty minutes per stage, with a large number of stages and is difficult to accurately reproduce. It is also limited to the configuration of the blocks in the near form.

A third type of method relates to printing by roller contact, such as offset printing, printing by etched roller or gravure printing and flexographic printing. They are more particularly used for linear and not mosaic patterns and the resolutions obtained are not very good. The disadvantages result from the difficulties encountered in obtaining a homogeneity of the inking deposited along the axis of the rollers and a homogeneity of the thickness deposited at each line.

These prior art methods suffer from numerous disadvantages and in particular the creation of a large number of defects, either of a punctiform (pinholes) nature, or linked with inhomogeneities on the scale of the screen, more particularly generated by the fact that each color undergoes the effects of the deposition process of the other colors and the production of the filters requires a large number of stages. Another disadvantage is the impossibility of checking the production of the screen during the deposition phases and of repairing faults and defects. Thus, each colored block constituting the filters of the screen must be defect-free, so that the present production efficiencies of such filters are between 10 and 50% and can be even lower when the screen size increases. This leads to another disadvantage, namely the very high production costs, because the materials used are very expensive and are wasted due to the deposition processes. A final, very important disadvantage is that no existing procedure makes it possible to produce large color filters with a size close to 1 meter, without fundamental limitations or requiring high investment costs.

Therefore the aim of the present invention is to obviate the aforementioned disadvantages using the high resolution, continuous ink jet printing method, in an apparatus for the production and repair of color filters.

SUMMARY OF THE INVENTION

For this purpose, a first object of the invention is an apparatus for the production and repair of color filters from a substrate on which is deposited a regular network of colored blocks contributing to the modification of the color by optical filter effect, characterized in that it comprises:

- a highly mechanically stable table on which is placed the substrate,
- a high resolution, continuous ink jet printing head having several printing modules with one or more ink ejection nozzles,
- an ink supply circuit for said printing head,
- a mechanical, motor-driven device for the relative displacement of the substrate with respect to the printing head with very high precision,
- a device for measuring the position of the table in two directions X and Y perpendicular to one another and substantially perpendicular to the direction Z of the droplets sprayed by the printing head, by laser interforometry or optical encoder,
- a positioning system with microscopic optics, whose position relative to the printing head in two directions X and Y is fixed, for positioning the impacts of the drops from the printing head with respect to optical marks on the substrate,
- a system for checking and controlling the complete apparatus. The term "very high precision displacement device" is understood stood to mean a displacement device with straightness, pitch and roll positioning tolerances of approximately 1 micrometer or less.

Printing by high resolution, continuous ink jet covers the high resolution, deflected, continuous ink jet method described in French patent applications 8814073 of 18.10.1989 and 9108482 of 5.7.1991 and U.S. Pat. No. 5,049,899, to which reference should be made, and the high resolution, binary, continuous ink jet method described in U.S. Pat. Nos. 4,620,196 and 4,901,088, to which reference should be made.

Another object of the present invention is a process for the production of color filters using the production apparatus according to the first object of the invention, characterized in that it comprises the following stages:

- storage of the position, shape and color informations concerning the blocks by the checking system and then by electronics cards allocated to each printing module of the printing head,
- putting into place of the substrate of the filter having optical positioning marks on the table below the printing head,
- printing test geometrical patterns by the printing head on the substrate,
- reading the respective positions of the positioning marks on the one hand and the test patterns on the other hand using the positioning system with microscopic optics,
- analysis, by the checking system, of the positional variations between the positioning marks and the test patterns and controlling the positioning of the impacts of the drops on the substrate,
- on-the-fly printing of each block on the substrate in accordance with a relative displacement algorithm between the sub-substrate and the printing head.

A third object of the invention is a process for the repair of color filters using an apparatus according to the invention.

BRIEF DESCRIPTION OF THE DRAWINGS

The invention is described in greater detail hereinafter relative to non-limitative embodiments and with reference to the attached drawings in which, apart from FIGS. 1 and 2 which have already been described, are shown.

DETAILED DESCRIPTION OF THE PREFERRED EMBODIMENT

The color filters produced or repaired by the ink jet method using the apparatus and processes of the invention must satisfy the following technical constraints:

the colored material must have an adapted optical transmission characteristic, the blocks must have a uniform size and thickness, the blocks must have a significant stability with respect to moisture, light and heat, because the sealing of the screen takes place at approximately 150° to 200° C., the filters must have a very high mechanical strength so as not to be damaged by subsequent manipulations connected with the manufacture of the screen, they must be free from dust particles, pinholes and scratches, the outer face facing the observer must be as planar and smooth as possible.

With regards to the actual high resolution, continuous ink jet printing method, no matter whether it is of the deflected or binary type, it must satisfy three main constraints.

Firstly the lines obtained by ink jet deposition must be very fine, because the blocks of the color filters have a side length of 80 to 300 microns. As the size of the impacts obtainable by the high resolution ink jet method is approximately 20 to 40 microns, this is completely compatible.

In addition, the color screens must be produced in large volumes, which involves high printing speeds. However, as the drop formation frequency by continuous ink jet methods is high, this requirement can be readily satisfied. Moreover, each nozzle prints a width of approximately 100 to 400 microns, which is compatible with the multijet printing head production constraints, which alone makes it possible to produce thousands of screens every day.

Finally, the production and applications of the color filters lead to the formulation of good color quantity inks, able to withstand high temperatures during the sealing of the screen and compatible with contact with other materials (ITO, liquid crystal), as well as with their deposition process. Thus, in high resolution, deflected, continuous jet printers, the inks must be constituted by a certain proportion of color pigments which are temperature-resistant in colorants, crosslinkable resins and solvents of various types, compatible with the operation of high resolution, ink jet printers. The high resolution, deflected, continuous ink jet method uses large diameter nozzles (30 to 50 microns for the application to the color filters according to the invention); which makes it possible to use various ink ranges, even with a high proportion of pigments, without any clogging risk.

Figure 1:
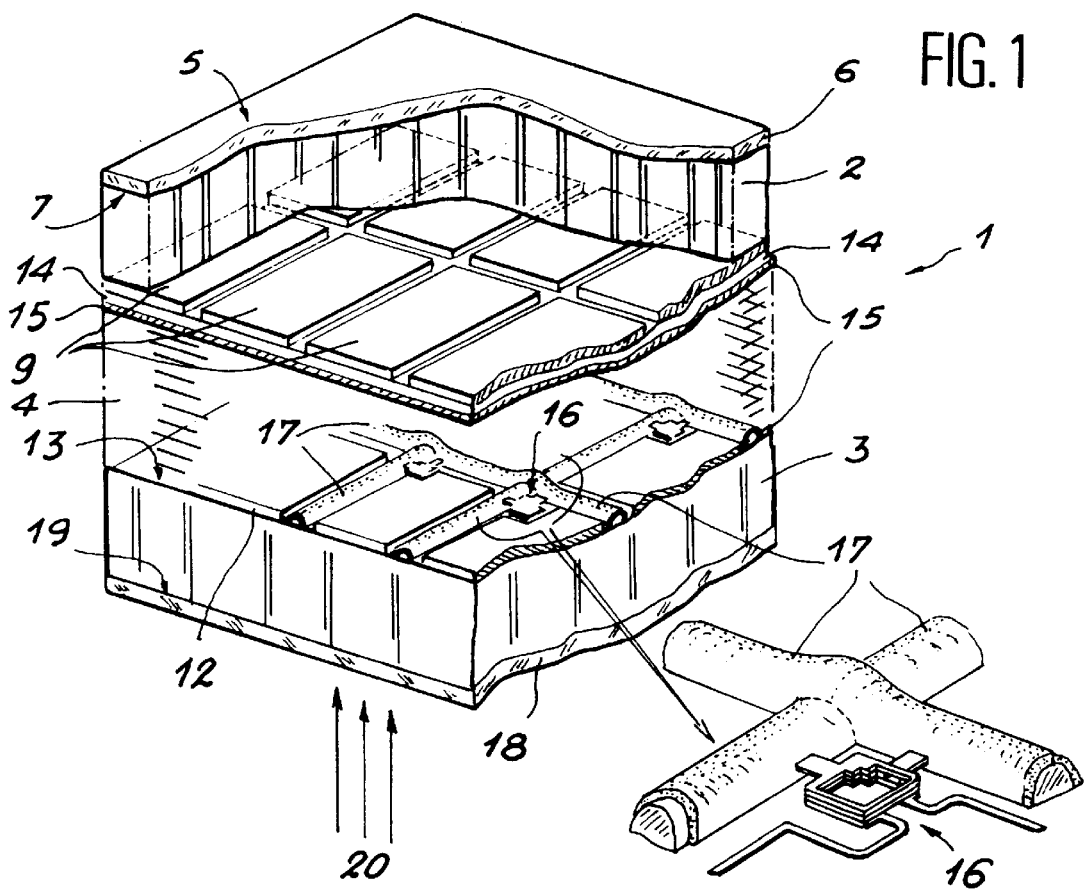
Figure 2:
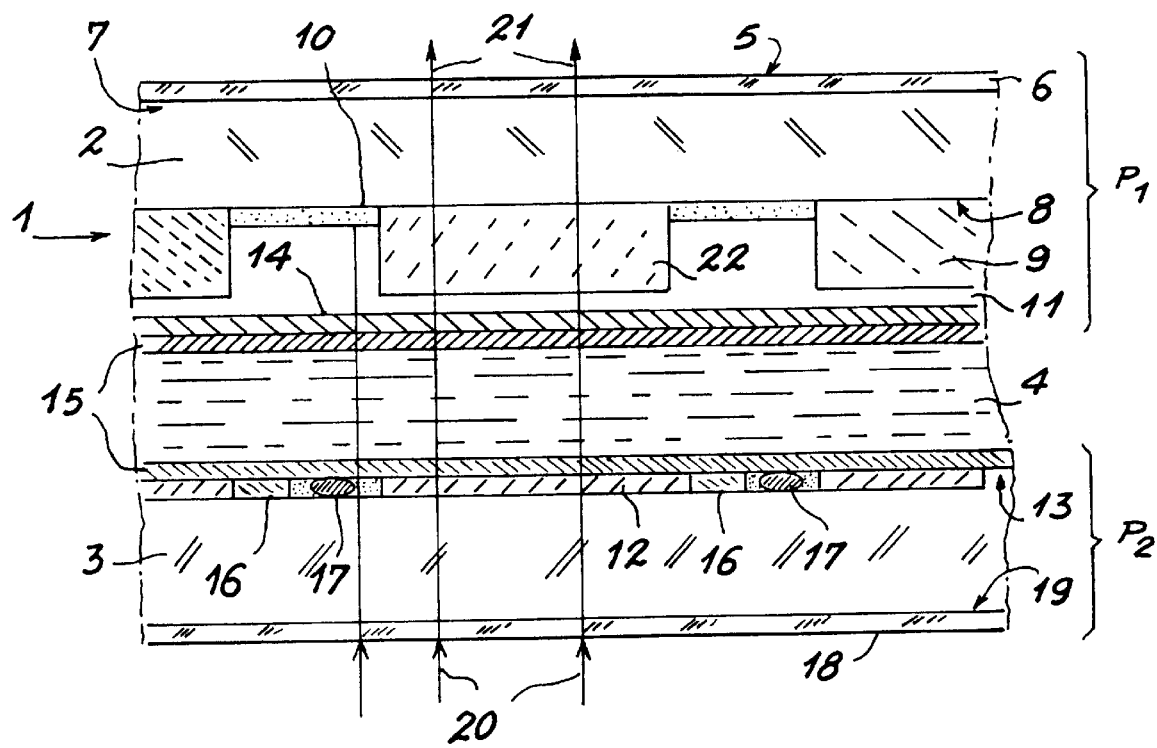
Figure 3:
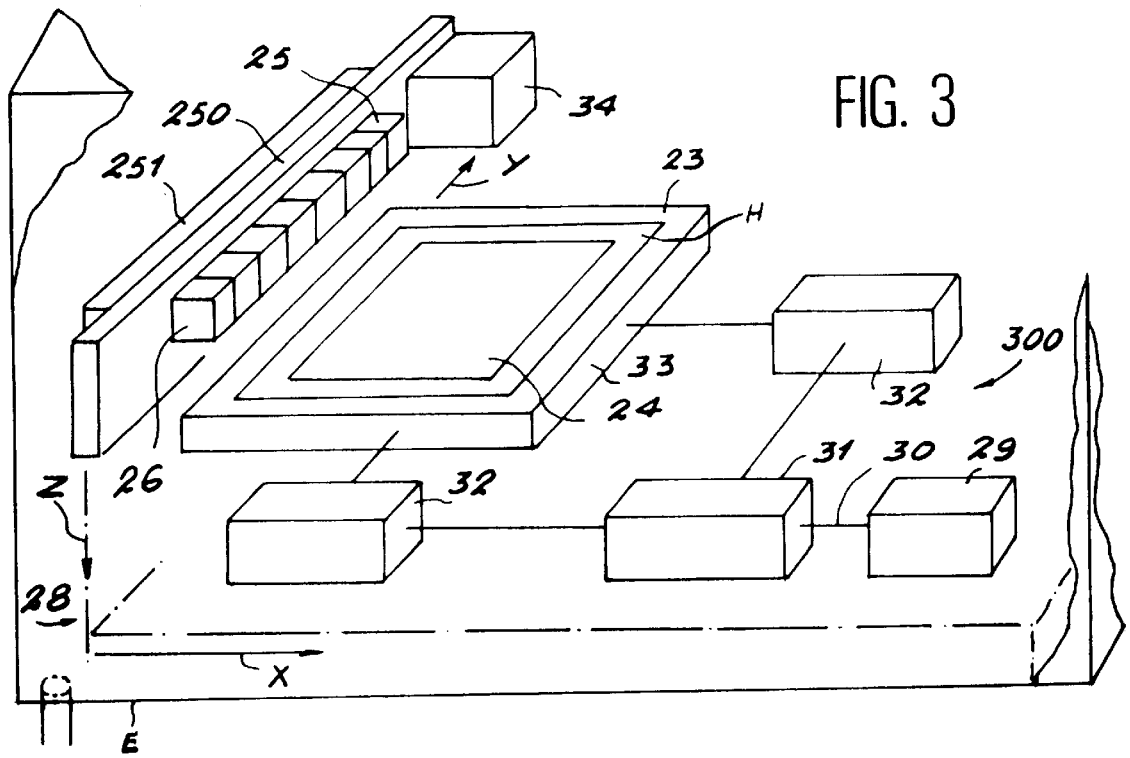
FIG. 3 A diagrammatic perspective view of the production apparatus according to the invention.
Figure 4:
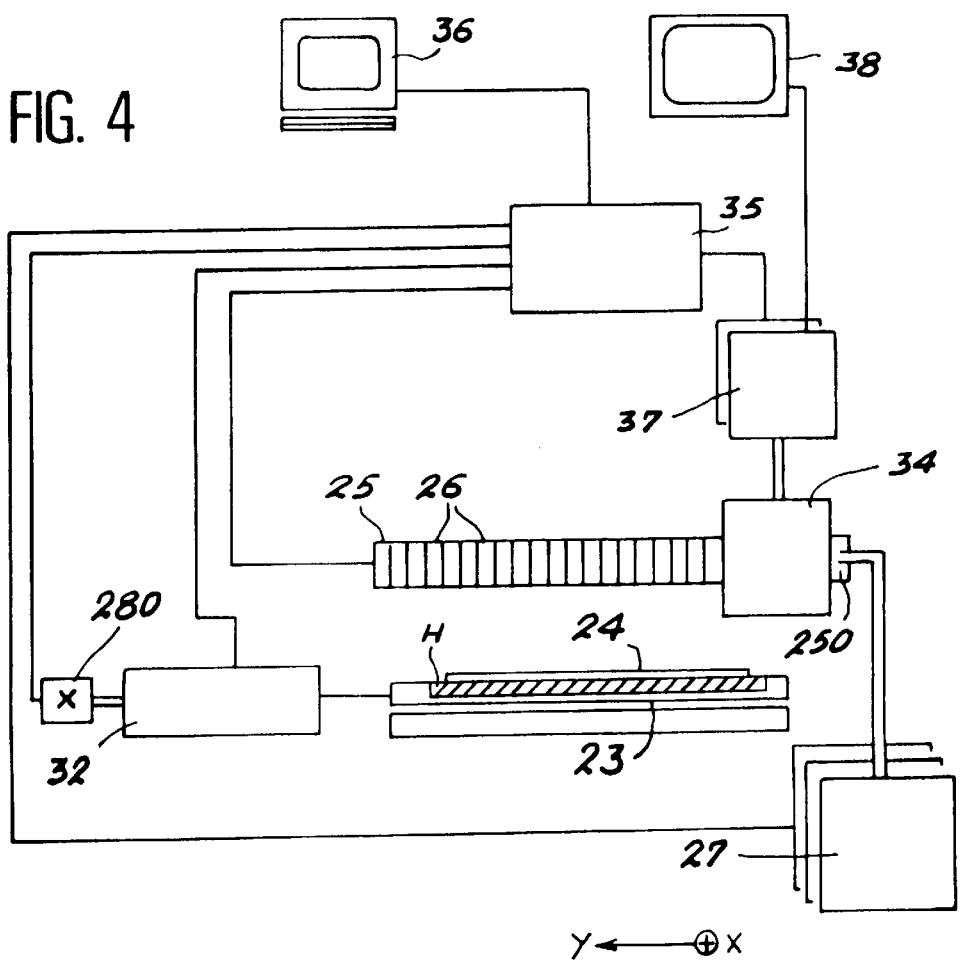
FIG. 4 A diagrammatic side view of the same apparatus.
Figure 5:
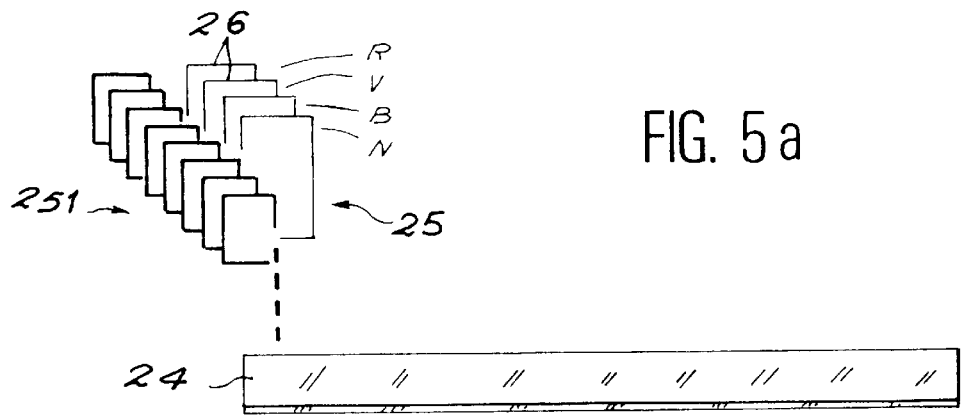
FIGS. 5a to 5d The stages of the color filter production process according to the invention.
Figure 5:
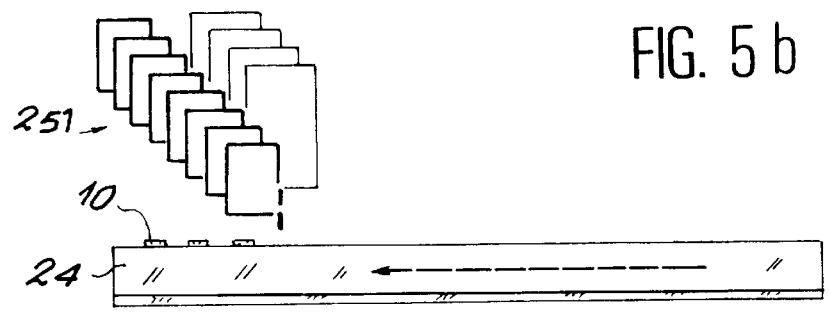
Figure 5:
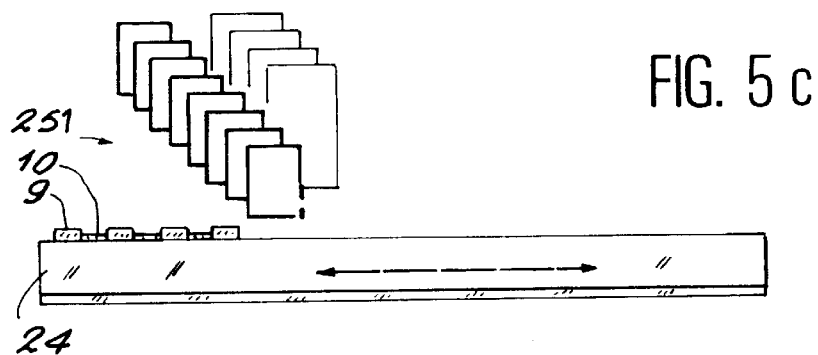
Figure 5:
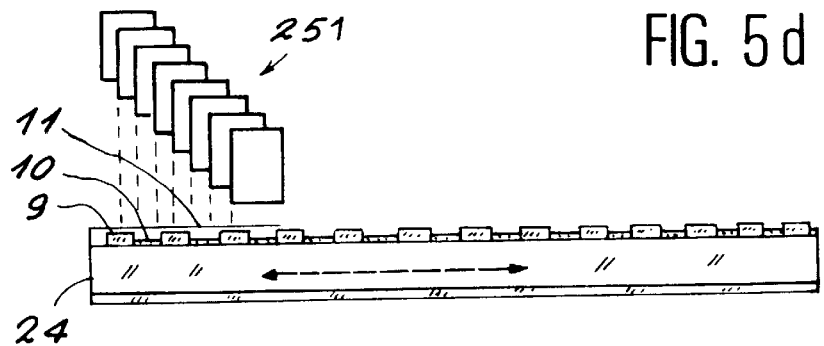
Figure 6:
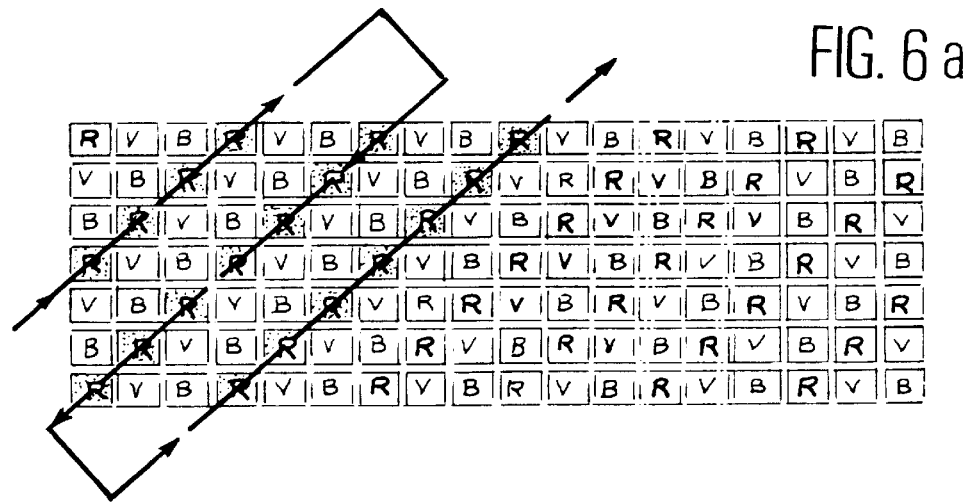
FIGS. 6a to 6c Particular examples of the printing directions of the blocks according to the color filter production process of the invention.
Figure 6:
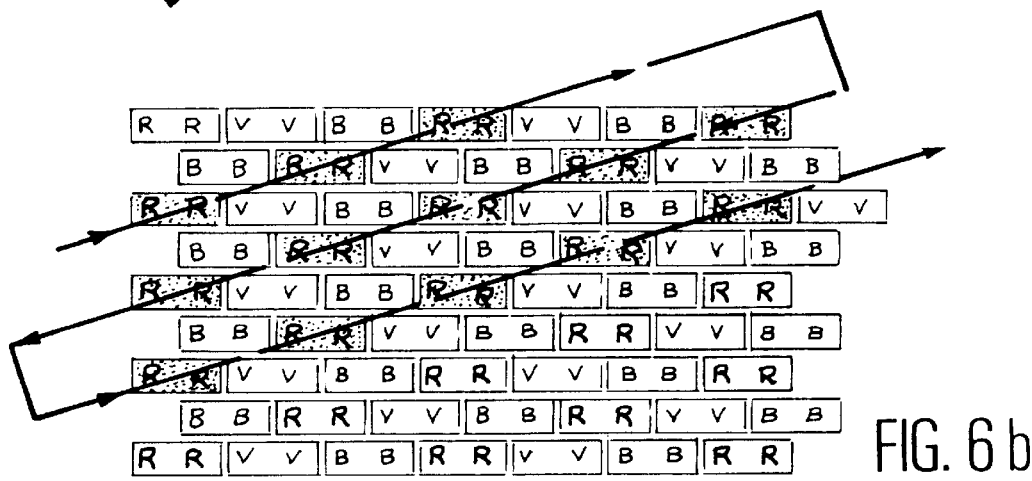
Figure 6:
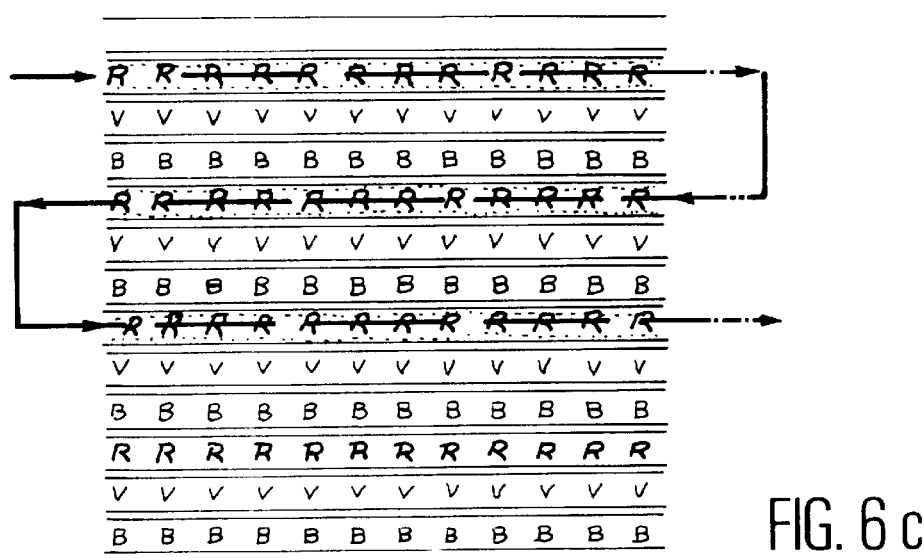

According to the invention, the apparatus for the production of color filters constituted by a network of colored blocks deposited on a substrate for producing the front face of a color screen is diagrammatically represented in perspective view in FIG. 3 and side view in FIG. 4. In the following description, the support of the color filter is typically of glass, e.g. a borosolicate glass, which has previously been chemically treated in order to aid the adhesion of the ink in a non-limitative embodiment.

The production apparatus comprises a highly mechanically stable table 23 supporting the glass substrate 24 of the color filter to be produced. This table can e.g. be installed on a pneumatic shock absorber. A printing head 25 having one or more printing modules 26 having one or more very high precision, droplet ejection nozzles and in which ejection takes place in a direction Z perpendicular to the plane of the substrate 24, is fixed to a mechanical support 250 and placed above the table 23. It is supplied by inks which can be of several colors. Each ink, corresponding to a given color, is supplied under pressure by an ink circuit 27 to all the ejection nozzles associated therewith. This ink circuit 27 also ensures the recycling of unused drops, the maintaining of the quality of the ink and an extensive filtering. This printing head 25 uses the high resolution, deflected, continuous jet method or the high resolution, binary, continuous jet method.

A device 28 for the displacement of the printing head 25 relative to the filter substrate 24 is provided. It must be a very high precision, motor-driven, mechanical device, which preferably carries out the displacement of the substrate under the printing head. This device can e.g. be a CARL ZEISS LM 100 system, which has a granite structure supporting the head of a microscope or a MICRO-CONTROLE UP bridge, which is a displacement unit in two perpendicular directions X and Y, of high precision and equipped with an air cushion guidance device sliding on a granite stand. According to FIG. 4, the displacement of the table 23 is brought about by two motors 280 in two directions X and Y, which are perpendicular to the direction Z. A device 300 for measuring the position of the table, according to the relative displacement axes X and Y with respect to the printing head, makes it possible to very accurately position the substrate 24 by means of a control of the motors 280, which ensure the displacement of the table 23 in the directions X and Y. This device can be an optical encoder or can use laser interferometry. In the latter case, a laser interferometry measuring device incorporates a circuit 29 for generating a stabilized laser beam 30 leading to a separating circuit 31, which supplies the laser beam to two interferometers 32 positioned at 90° from one another in front of two orthogonal sides of the table 23 having measuring mirrors 33. This measuring device can be a MICRO-CONTROLE ILE 400 increment linear encoder.

The device according to the invention also incorporates an optical system 34 used for measuring the position of the impacts of the ink drops ejected by the different nozzles of the printing head with respect to optical marks present on the substrate to be printed. In the case of a device using the deflected, continuous let method, the positioning of the drop impacts is brought about by a control of the trajectories of the ink drops of each of the nozzles on their charging voltage, until the position of the impacts coincides with the positioning marks. This electronic compensation of the trajectories is very fast and can take place "on-the-fly" during the acceleration and deceleration phases of the substrate for each scan. This optical system, whose position relative to the printing head in the two displacement directions X and Y is fixed, can be a system having microscopic optics. In the case of a device using the binary jet method, the positioning of the drop impacts is brought about by compensating the position of the table on which the substrate is placed. This compensation can be obtained by a mechanical regulation of the position of each of the jets located on the beam serving as a mechanical support for the printing heads or can take place at the electronic image of the points to be printed.

This optical system 34 can detect the position of the impacts of the microdroplets and that of the reference marks using a conventional optical method. It e.g. has a microscope operating in visible light and having a high magnification. Position detection takes place by analyzing the image and is dependent on the illumination conditions.

The optical system 34 can also use the laser sweep microscope method in coherent light (laser) and is focused. Position detection takes place on the basis of the analysis of the intensity and the phase variation of the light reflected by the surface of the substrate and therefore the deposited ink film. It constitutes a measurement of the profile of the substrate surface.

Other variants are possible, which make use of light beams of a visible or non-visible nature or of a coherent or non-coherent nature, in microscopic dimensions.

These optical marks can correspond to the black matrix of the color filter used for defining the colored blocks and which will have previously been deposited on the substrate by any means, including by ink jet using the apparatus according to the invention. They can also be geometrical marks deposited by random means. It would be of particular interest to also print an identification on the substrate, e.g. in the form of alphanumeric characters, which could advantageously be used for computer-based production follow-up, e.g. for linking the substrate with informations associated therewith such as the image of the filters to be deposited.

Finally, the apparatus according to the invention has a checking and control system 35 relative to all the components constituting the apparatus. It is responsible for controlling the printing head 25, supervising the ink circuits 27, synchronizing with the relative displacement device 28 of the printing head and the substrate, communication with the optical positioning system 34 and the control of an interface 36 with the operator, materialized by an inspection screen and a keyboard.

According to an automated variant of the apparatus according to the invention, the optical positioning system 34 incorporates an automatic setting of the focal distance using an autofocus laser system 37, which analyzes the image and guarantees the focusing thereof no matter what part of the substrate is sighted. In this case, the optical system permits on the one hand the positioning, rereading of the identification codes, the testing of the deposited filters by measuring the critical dimensions, overlay, thickness measurement of the block or measurement of colors and on the other hand the repair of filters considered to be defective.

According to another variant, the mechanical support 250 of the printing head 25 also makes it possible to fix a very wide, average resolution, multijet printing head 251, authorizing the total and uniform coverage of the substrate in a limited number or single scan of said substrate. Such a printing head, described in French patent application 92 04503 entitled "Very wide printing device and process for checking the printing quality obtained with the device" is used for depositing planarization and/or alignment layers, which reduces the number of stages of the color filter production process and improves production efficiency.

According to another variant, the production apparatus can also incorporate one or more resin crosslinking or drying systems. As a function of the materials used for the deposits, this can be in the form of a heating plate placed beneath the substrate of the filter, or a system emitting a high-energy flux towards the substrate (hot inert gas, ultraviolet radiation lamp) for initiating the crosslinking of each ink layer before passing to the following layers (prebake) or performing the final crosslinking, e.g. in an oven. All the operations of loading and unloading substrates with respect to the table, the alignment of the substrates, printing the color filters and crosslinking can be automated, which in view of the compactness of the production apparatus, enables its placing in a small enclosure where the atmosphere, temperature and cleanness are precisely controlled and which is linked with the outside by locks. This ensures a very high production efficiency of the color filters, for modest production costs, as well as an optimum utilization of the fluids, because no material is lost.

Another object of the invention is a process for the production of color filters using a production apparatus of the type described hereinbefore. According to this process, all the informations linking the position, the shape of the blocks and the color intended for them are known at the start of production and must be stored by the checking system in an electronic memory, prior to being teleloaded into electronic cards allocated to each printing module of the printing head. Then, the substrate 24, which has optical positioning marks, is moved under the printing head 25, which prints geometrical test patterns according to FIG. 5a. The microscopic optics system reads the position (Xo, Yo) of the positioning marks on the one hand and the position (Xi, Yi, i=1 to n, n=number of nozzles) of the test patterns printed by the n nozzles. In FIGS. 5a to 6c the letters R, V, B, N refer respectively to red, green, blue and black.

The position variants between said positioning marks and said test patterns are analyzed by the checking system, which then determines, in the case of the deflected, continuous jet method, the compensation of the charging voltage which must be carried out for each nozzle and also controls the trajectory of the ink drops by action on their charging voltages, and in the case of the binary jet method, the position compensation of the substrate.

It is then possible for the printing stage to start. The substrate is moved bidirectionally under the printing head and each block is printed on-the-fly by electronically controlled nozzles and whereof the ink color corresponds to that of the block, cf. FIG. 5c. As a function of the substrate wettability conditions and the geometrical definition of the screen blocks, several relative displacement algorithms between the printing head and the substrate, as well as several droplet deposition strategies can be envisaged. With regards to the screen geometry, the production apparatus can preferably print in the direction aligning the greatest number of blocks corresponding to the same color, so as to limit the necessary number of passes of the printing head on the substrate. This direction is generally diagonal for "mosaic" patterns, as shown in FIGS. 6a and 6b, whereas it is one of the axes of symmetry of the filter for linear patterns, cf. FIG. 6c. In order to take account of the characteristics of the spreading of the ink, the presence of the black matrix and the wettability of the blocks, production will take place in the single deflection mode with a variable number of droplets or in the frame or screen mode. In the first case, each nozzle is placed above the centre of a block and ejects a large number of droplets in the same direction. Their impacts are superimposed and spread in order to fill the block defined by the matrix. The frame or screen mode leads to printing by each nozzle of droplet sequences in variable numbers and on different trajectories in order to uniformly cover the entire surface of the block aimed at by the nozzle.

As a function of the desired optical density for the color filters and in order to achieve a better planarity of said filters, the production process will have a printing stage performed in several successive passes, with superimposing or interleaving of the impacts of the drops with a drying phase between each printing pass.

The production process according to the invention can also have an initial stage of printing the black matrix 10 by depositing the continuous ink jet ejected by the printing head 25 (FIG. 5b). It can also have a final stage of printing a planarization layer 11 covering the thus printed, colored blocks using a very wide, medium resolution, multijet printing head, which can be fixed to the mechanical support of the high resolution printing head (FIG. 5d). This multijet printing head authorizing the total and uniform coverage of the substrate in one or a small number of sweeps can also deposit the alignment layer.

Finally, the invention relates to a process for the repair of color filters using the aforementioned production apparatus, no matter whether said filters are produced according to the process of the invention or by conventional processes. This process involves a first stage of an operator indicating to the checking system 35 the inspection operations which have to be carried out, e.g. specifying certain groups of blocks assumed to be defective. The microscopic optics system 24, placed close to the printing head 25, marks the defective blocks which will then be displayed on a checking screen 38 viewed by the operator. The latter or any other color image recognition system can then recognize the characteristics of the defects, i.e. their color, position and geometry. The operator defines a repair sequence which is transmitted to the checking system, which supplies printing instructions to the printing modules. Each defect will be corrected by the selective deposition of ink ejected by a single nozzle and having the color corresponding to the defective block.

The apparatus and processes according to the invention do not solely apply to color filters for liquid crystal flat screens, but also to color image acquisition systems such as color electronic cameras in which the color filter is directly deposited on the sensitive element of the camera. In this particular case, the color filter is intended to truncate the color spectrum received by the sensitive element of the camera so that the signal received by each block is representative of a single spectral characteristic of the light received. The invention has the advantage of not generating defects during the deposition of the colored blocks and of performing a precise check during deposition, whilst leading to no material losses, because the blocks are obtained from the impact of specially ejected ink drops. In addition, the production costs for the color filters are well below existing levels and the production efficiency is very high. Finally, the ink jet method makes it possible to produce a range of screen sizes from a few centimeters diagonal, e.g. for pocket televisions, to close to 1 meter for wall screens, without any limitation of principle or high investment expenditure.

We claim:

1. An apparatus for the production and repair of color filters from a substrate in which is deposited a regular network of colored blocks contributing to the modification of the color by an optical filter effect, said apparatus comprising:

a substrate placed on a mechanically stable table;

a high resolution, continuous, ink jet printer head positioned fixed above said table and having a plurality of printing modules with at least one ink ejection nozzle;

at least one circuit for supplying ink to said printing head;

a mechanical, motor-driven device for highly precise displacement of the substrate with respect to the printing head;

a device for measuring a position of the table in two directions perpendicular to each other and substantially perpendicular to a direction of droplets ejected by said printing head;

a positioning system with microscopic optics, whose position relative to the printing head in two directions X and Y is fixed and which functions to position the impacts of said droplets ejected by the printing head relative to optical marks on said substrate.

2. Apparatus according to claim 1, characterized in that the printing head uses a high resolution, deflected, continuous ink jet method.

3. Apparatus according to claim 1, characterized in that the printing head uses a high resolution, binary, continuous ink jet method.

4. Apparatus according to claim 1, characterized in that the device for measuring the position of the table is constituted by laser interferometry circuits.

5. Apparatus according to claim 1, characterized in that the microscopic optics positioning system incorporates an autofocus laser system (37) for the automatic setting of a focal distance.

6. Apparatus according to claim 1, further comprising a very wide, multijet printing head fixed to the side of a high resolution printing head.

7. Apparatus according to claim 1, characterized in that the optical marks present on the substrate correspond to black matrix of a filter used for defining the colored blocks.

8. Apparatus according to claim 1, further comprising at least one system for drying and crosslinking resins contained in the ink.

9. Apparatus according to claim 8, characterized in that the drying system is a heating plate placed beneath said substrate.

10. Apparatus according to claim 8, characterized in that the drying system is a system for emitting a high-energy flux towards the substrate.

11. Apparatus according to claim 1, wherein said apparatus is placed in an enclosure having a controlled atmosphere, temperature and cleanness.

12. A process for the production of color filters using a production apparatus having a substrate on which is deposited a regular network of colored blocks contributing to the modification of the color by an optical filter effect wherein said substrate is positioned on a mechanically stable table with an ink jet printer head positioned above the table and including several printing modules with at least one ink ejection nozzle and a mechanically driven motor device for precise relative displacement of the substrate with respect to the printing head and a device for measuring the position of the table in two directions perpendicular to one another and substantially perpendicular to a direction of droplets ejected by the printing head with a positioning system having microscopic optics whose position relative to the printing head is fixed in two directions and which functions to position impact of droplets ejected by the printing head relative to the optical marks on the substrate and wherein a checking and control system checks the complete apparatus, said process comprising the steps of:

obtaining and storing a position, shape and color information concerning said blocks obtained by said checking system and subsequently storing said information on an electronic card allocated to each of said printing modules of said printing head;

placing optical positioning marks on said table below said printing head;

printing test geometrical patterns by said printing head on said substrate;

reading respective positions of said positioning marks and reading test patterns produced by said microscopic optics positioning system;

analyzing, by said checking system, positional variations between positioning marks and test patterns and controlling positioning of droplet impact on said substrate; and printing on-the-fly each of said blocks on said substrate in accordance with a relative displacement algorithm between the substrate and the printing head.

13. Production process according to claim 12, wherein the step of controlling the positioning of the droplet impact on the substrate includes the step of controlling a trajectory of the ink drops ejected by the printing head by charging voltages of said ink drops, in the case of deflected, continuous ink jet printing.

14. Production process according to claim 12, further comprising the step of controlling the positioning of the drop impacts on the substrate by a compensation of the position of the table on which is placed the substrate.

15. Production process according to claim 12, wherein the step of printing on-the fly each of said blocks on the substrate further comprises the step of printing in a direction aligning a greatest number of blocks corresponding to a same color.

16. Production process according to claim 12, wherein the step of printing on-the fly each of said blocks on the substrate further comprises the steps of ejecting droplets on a single trajectory and placing a variable number of drops ejected by said at least one ink ejection nozzle below center of the blocks.

17. Production process according to claim 12, wherein the step of printing on-the fly each of said blocks on the substrate further comprises the step of printing in a frame of screen mode, with several sequences of drops ejected in accordance with different trajectories in order to print an entire surface of each of said blocks.

18. Production process according to claim 12, wherein the step of printing on-the fly the blocks on the substrate further comprises an initial step of printing a black matrix on the substrate by the printing head.

19. Production process according to claim 12, wherein the step of printing on-the fly the blocks on the substrate further comprises a final step of printing a planarization or alignment layer by a medium resolution, multijet printing head.

20. Production process according to claim 12, wherein the step of printing test pattern geometrical patterns further comprises the step of printing by several successive passes of the printing head on the substrate, with the superimposing or interleaving of drop impacts and with a drying phase between each printing pass.

21. Process for the repair of color filters using a production process having a substrate on which is deposited a regular network of colored blocks contributing to the modification of the color by an optical filter effect wherein said substrate is positioned on a mechanically stable table wherein an ink jet printer head is positioned above the table and including several printing modules with at least one ink ejection nozzle and a mechanically driven motor device for a precise relative displacement of the substrate with respect to the printing head and a device for measuring the position of the table in two directions perpendicular to one another and substantially perpendicular to a direction of droplets ejected by the printing head with a positioning system having microscopic optics whose position relative to the printing head is fixed in two directions and which functions to position impact of droplets ejected by the printing head relative to the optical marks on the substrate and wherein a checking and control system checks the complete apparatus, said process comprising the steps of:

providing an indication by an operator to the checking system of the inspection of the operations to be carried on the substrate, marking of defective blocks by the microscopic optics positioning system, displaying on a checking screen of said defective blocks, recognizing characteristics of the defects by the operator or any other color image recognition system, defining a repair sequence transmitted to the checking system, and printing by selective deposition of ink ejected by a single nozzle having the color corresponding to the defective blocks.

\* \* \* \* \*

UNITED STATES PATENT AND TRADEMARK OFFICE
CERTIFICATE OF CORRECTION

PATENT NO. : 5,847,720
DATED : Dec. 8, 1998
INVENTOR(S) : Alain Dunand

It is certified that error appears in the above-identified patent and that said Letters Patent is hereby corrected as shown below:

On the title page, item [73], the assignee's city is incorrect. It should be:

--Bourg-Les-Valence Cedex, France--

Signed and Sealed this

Seventh Day of September, 1999

Attest:

Q. TODD DICKINSON

*Attesting Officer*     *Acting Commissioner of Patents and Trademarks*